US010065112B2

(12) United States Patent
Guo

(10) Patent No.: US 10,065,112 B2
(45) Date of Patent: Sep. 4, 2018

(54) CLAMPING TYPE GAME OPERATING HANDLE

(71) Applicant: SHENZHEN SAITAKE ELECTRONIC CO., LIMITED, Shenzhen, Guangdong (CN)

(72) Inventor: Siming Guo, Guangdong (CN)

(73) Assignee: SHENZHEN SAITAKE ELECTRONIC CO., LIMITED, Shenzhen (CN)

( * ) Notice: Subject to any disclaimer, the term of this patent is extended or adjusted under 35 U.S.C. 154(b) by 84 days.

(21) Appl. No.: 15/371,244

(22) Filed: Dec. 7, 2016

(65) Prior Publication Data

US 2018/0133594 A1 May 17, 2018

(30) Foreign Application Priority Data

Nov. 16, 2016 (CN) .................... 2016 2 1258278 U

(51) Int. Cl.
*A63F 13/245* (2014.01)
*A63F 13/98* (2014.01)

(52) U.S. Cl.
CPC ............ *A63F 13/245* (2014.09); *A63F 13/98* (2014.09)

(58) Field of Classification Search
USPC ......................................................... 463/37
See application file for complete search history.

(56) References Cited

U.S. PATENT DOCUMENTS

| 4,905,988 | A | * | 3/1990 | Mooneyhan | A63B 23/16 482/50 |
| 5,354,026 | A | * | 10/1994 | Bulla | F16M 11/14 24/499 |
| 9,387,396 | B2 | * | 7/2016 | Hijmans | A61H 1/0274 |
| 9,474,258 | B2 | * | 10/2016 | Dunlop | A01K 89/0108 |
| 2006/0174734 | A1 | * | 8/2006 | Hunter | B25B 7/123 81/367 |
| 2013/0059696 | A1 | * | 3/2013 | Hijmans | A61H 1/0274 482/8 |

* cited by examiner

*Primary Examiner* — Pierre E Elisca

(57) ABSTRACT

The present application relates to a clamping type game operating handle. The clamping type game operating handle comprises a left handgrip, a right handgrip and a bearing balance seat, the right handgrip and the left handgrip are mutually complementary in structure; and the left handgrip (10) utilizing the front tension spring (40) and the right handgrip (20) utilizing the back tension spring (50) perform telescopic movement in the left-right direction corresponding to the bearing balance seat (30). According to the clamping type game operating handle, a user can stably fix an electronic device by gripping the handgrips, thereby preventing palms or fingers from excessively occupying a limited screen space of the electronic device, not only ensuring the experience effect of a game, but also fully releasing the palms or the fingers.

7 Claims, 3 Drawing Sheets

CLAMPING TYPE GAME OPERATING HANDLE

CROSS-REFERENCE TO PRIOR APPLICATION

The present application claims the benefit of Chinese Utility Model Application No. 201621258278.X filed on Nov. 16, 2016, the contents of which are incorporated herein by reference.

BACKGROUND

Technical Field

The present application relates to the technical field of gaming devices, and in particular to a clamping type game operating handle.

Related Art

As science and technology are continuously developing and living standard of people is gradually improving, smart phones, tablet personal computers and the like have been become important electronic devices daily carried on people, and in particular more and more large-screen touch screens arise, thereby facilitating rapid development of the industry of mobile games (which are games running in mobile phones or the tablet personal computers); therefore, performances of the smart phones and the table personal computers are higher and higher, and display effects, playability and the like of the mobile games are also higher and higher, which greatly attracts the attention of people.

Generally, in most of mobile games suitable for the touch screens, direction keys and function keys are designed in mobile game programs. By taking a smart phone for example, people only needs to hold the smart phone and then can control the mobile games. However, such operation manner has the following disadvantages: 1, in a smart phone holding process, palms or fingers occupy a certain space of the touch screen, so that game frames displayed on the touch screen are narrower, and the experience effect of the mobile games is reduced; and 2, for keeping the controllability on the mobile games, people usually utilizes double hands to hold the smart phone at a fixed posture for a long time in order to ensure that the mobile games are controlled under the condition that the smart phone is stably placed; therefore, one of the double hands or a plurality of fingers cannot be free, and due to holding the smart phone for a long time, the fingers or the palms are ached.

SUMMARY

In view of disadvantages in the prior art, an objective of the present application is to provide a clamping type game operating handle.

In order to achieve the objective described above, a technical scheme adopted by the present application is as follows:

the clamping type game operating handle comprises a left a left handgrip and a right handgrip that are distributed mutually in mirror image, and a bearing balance seat arranged between the left handgrip and the right handgrip;

a left main sliding plate and a left guide plate are distributed mutually forth and back in parallel and are formed on the right side wall of the left handgrip, the right end of the left main sliding plate and the right end of the left guide plate are placed in the bearing balance seat, a left locating plate is formed on the right side wall of the left main sliding plate, a back guide sliding slot is formed between the left main sliding plate and the left guide plate, a front limit slot that is distributed in left-right directions and extends to the left locating plate is opened in the left main sliding plate, a front tension spring that is distributed in the left-right directions is mounted in the front limit slot, the left end of the front tension spring is fixed on the inner wall of the left side of the bearing balance seat, and the right end of the front tension spring is fixed on the right side wall of the front limit slot;

a right guide plate and a right main sliding plate are distributed mutually forth and back in parallel and are formed on the left side wall of the right handgrip, the left end of the right guide plate and the left end of the right main sliding plate are placed in the bearing balance seat, a right locating plate is formed on the left side wall of the right main sliding plate, a front guide sliding slot is formed between the right main sliding plate and the right guide plate, a back limit slot that is distributed in left-right directions and extends to the right locating plate is opened in the right main sliding plate, a back tension spring that is distributed in the left-right directions is mounted in the back limit slot, the left end of the back tension spring is fixed on the left side wall of the back limit slot, and the right end of the back tension spring is fixed on the inner wall of the right side of the bearing balance seat;

the left locating plate is embedded in the front guide sliding slot, the right locating plate is embedded in the back guide sliding slot, the left handgrip utilizing the front tension spring and the right handgrip utilizing the back tension spring perform telescopic movement in the left-right direction corresponding to the bearing balance seat.

Preferably, each of the left handgrip and the right handgrip comprises an arc-surface handgrip part and a planar bearing part that is formed at the front end of the arc-surface handgrip part, a limit plate part that is connected with the arc-surface handgrip part into a whole body is formed in front-back directions on one side, far away the bearing balance seat, of the planar bearing part, and the limit is plate part and the arc-surface handgrip part surround the upper surface of the planar bearing part to form an L-shaped placement platform part.

Preferably, a hollow stripped hole is opened in each limit plate part.

Preferably, an arc-surface chute inclined towards the corresponding L-shaped placement platform part is opened on the upper surface of the front end of the corresponding arc-surface handgrip part, and an antiskid pad is arranged on the upper surface of the corresponding L-shaped placement platform part.

Preferably, the bearing balance seat comprises a base and an upper housing that are spliced into a whole body; on the lower surface of the upper housing, a back right bushing post for fixing the right end of the back tension spring is arranged and is located on the right-end side of the back tension spring, and a front left bushing post for fixing the left end of the front tension spring is arranged and is located on the left-end side of the front tension spring; and a front right bushing post for fixing the right end of the front tension spring is arranged on the right side wall of the front limit slot, and a back left bushing post for fixing the left end of back tension spring is arranged on the left side wall of the back limit slot.

Preferably, a plurality of racks distributed mutually left and right in parallel are arranged on the bottom surface of the left guide plate and the bottom surface of the right guide plate, and a lock plate buckle that is propped against the corresponding racks is arranged in each of regions covered by the left guide plate and the right guide plate.

Preferably, an antiskid pad is arranged on the upper surface the upper housing.

By adopting the technical scheme described above, the clamping type game operating handle, which is provided by the present application, has the advantages: by utilizing elastic forces of the tension springs and each position correspondence relation between the sliding plates, between the guide plates and between the locating plates, an electronic device, such as a smart phone, a tablet personal computer and the like, can be placed on the bearing balance seat and is clamped between the two handgrips, a user can grip the handgrips to stably fix the electronic device without needing of directly gripping the electronic device, thereby preventing palms or fingers from excessively occupying a limited screen space of the electronic device, not only ensuring the experience effect of the game, but also fully releasing the palms or the fingers to perform other operations, and preventing a problem that the palms and the fingers are easy to be ached due to keeping a fixed posture for a long time; and the clamping type game operating handle has a simple and compact structure, is convenient in use and arrangement, and has greatly strong practical value and market promotional value.

DESCRIPTION OF EMBODIMENTS

Embodiments of the present application are described below in detail in conjunction with accompanying drawings, but the present application may be implemented by various manners limited and covered by the appended claims.

Figure 1:
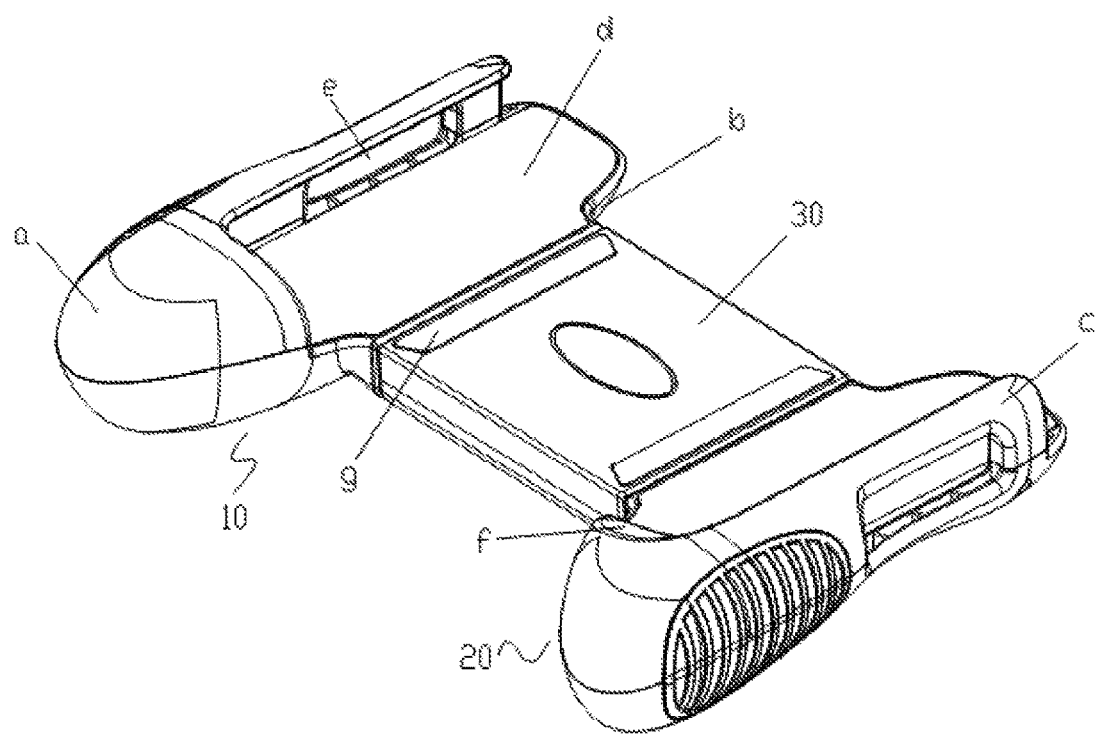
FIG. 1 is an assembly diagram of an overall structure in an embodiment according to the present application.
Figure 2:
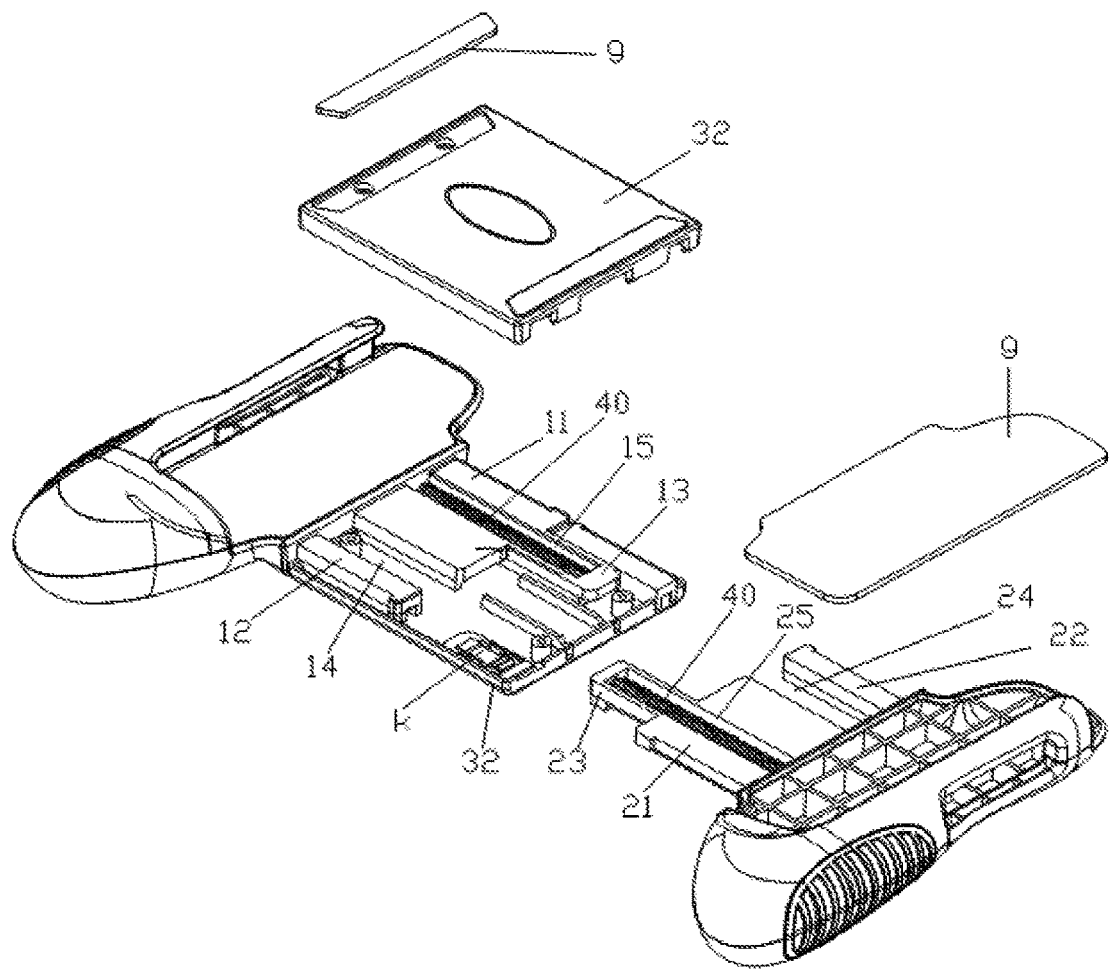
FIG. 2 is an exploded diagram (1) of the structure in the embodiment according to the present application.
Figure 3:
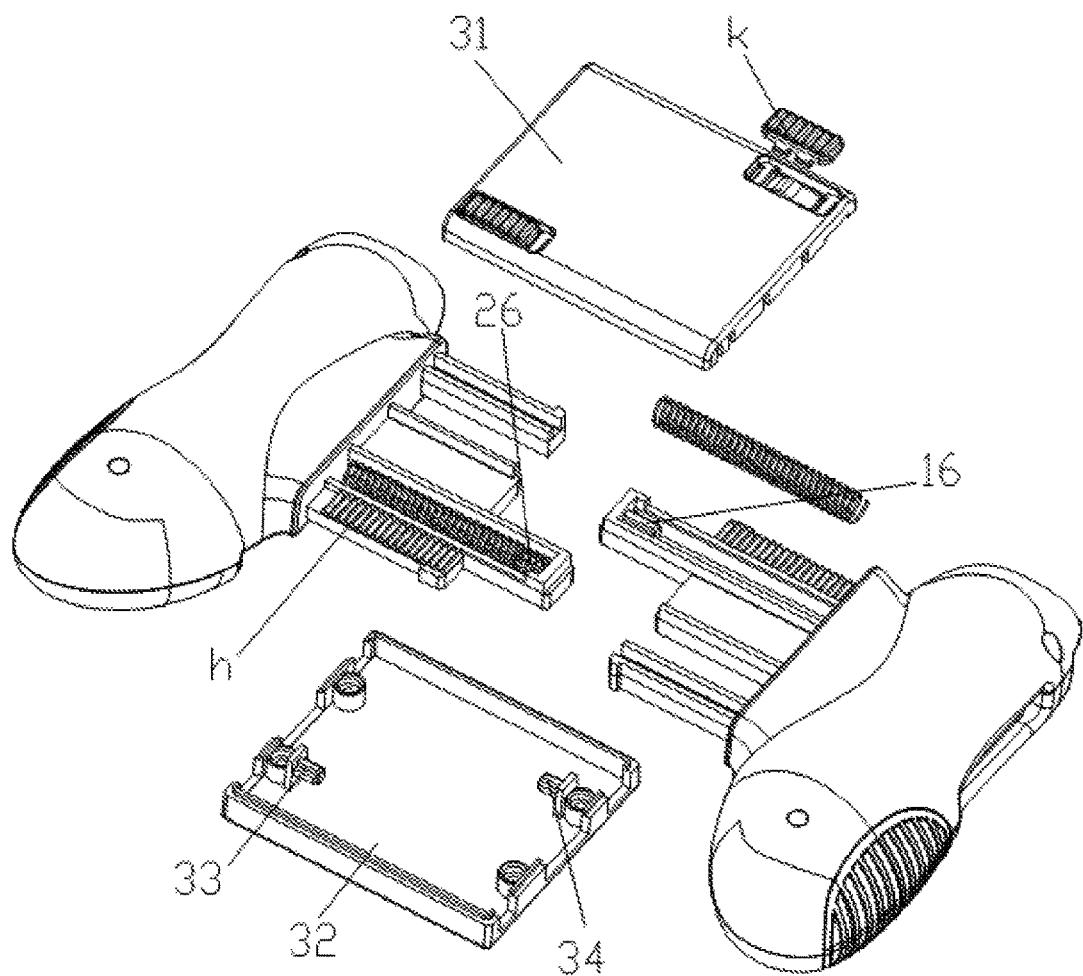
FIG. 3 is an exploded diagram (2) of the structure in the embodiment according to the present application.

As shown in FIG. 1 to FIG. 3, a clamping type game operating handle, provided by the embodiment, comprises a left a left handgrip 10 and a right handgrip 20 that are distributed mutually in mirror image, and a bearing balance seat 30 arranged between the left handgrip 10 and the right handgrip 20, wherein a left main sliding plate 11 and a left guide plate 12 are distributed mutually forth and back in parallel and are formed on the right side wall of the left handgrip 10, the right end of the left main sliding plate 11 and the right end of the left guide plate 12 are placed in the bearing balance seat 30, a left locating plate 13 is formed on the right side wall of the left main sliding plate 11, a back guide sliding slot 14 is formed between the left main sliding plate 11 and the left guide plate 12, a front limit slot 15 that is distributed in left-right directions and extends to the left locating plate 13 is opened in the left main sliding plate 11, a front tension spring 40 that is distributed in the left-right directions is mounted in the front limit slot 15, the left end of the front tension spring 40 is fixed on the inner wall of the left side of the bearing balance seat 30, and the right end of the front tension spring 40 is fixed on the right side wall of the front limit slot 15; correspondingly, the right handgrip 20 utilizes a structure form mutually complementary with the left handgrip 10, that is: a right guide plate 22 and a right main sliding plate 21 are distributed mutually forth and back in parallel and are formed on the left side wall of the right handgrip 20, the left end of the right guide plate 22 and the left end of the right main sliding plate 21 are placed in the bearing balance seat 30, a right locating plate 23 is formed on the left side wall of the right main sliding plate 21, a front guide sliding slot 24 is formed between the right main sliding plate 21 and the right guide plate 22, a back limit slot 25 that is distributed in left-right directions and extends to the right locating plate 23 is opened in the right main sliding plate 21, a back tension spring 50 that is distributed in the left-right directions is mounted in the back limit slot 25, the left end of the back tension spring 50 is fixed on the left side wall of the back limit slot 25, and the right end of the back tension spring 50 is fixed on the inner wall of the right side of the bearing balance seat 30; furthermore, the left locating plate 13 is embedded in the front guide sliding slot 24, and the right locating plate 23 is embedded in the back guide sliding slot 14.

Therefore, the left handgrip 10 and the right handgrip 20 can simultaneously or respectively perform telescopic movement (namely close to or far away with each other) corresponding to the bearing balance seat 30 in the left-right directions by utilizing elastic forces of the front tension spring 40 and the back tension spring 50 and each position correspondence relation between the sliding plates, between the guide plates and between the locating plates. After the tension springs are stretched, an electronic device storing a game, such as a smart phone, a tablet personal computer, even a game machine and the like, can be placed on the bearing balance seat 30 and is disposed between the two handgrips; the tension springs are loosened, and under the action of tensile forces of the tension springs, the electronic device is firmly clamped between the two handgrips; and at this point, a user can grip the handgrips to stably fix the electronic device without needing of directly gripping the electronic device, thereby preventing palms or fingers from excessively occupying a limited screen space of the electronic device, not only ensuring the experience effect of the game, but also fully releasing the palms or the fingers to perform other operations, and preventing a problem that the palms and the fingers are easy to be ached due to keeping a fixed posture for a long time.

In order to ensure the arrangement stability of the electronic device, and further optimize the structure of the whole handle to meet the ergonomic design and to improve the using comfortableness of the handle, in the embodiment, each of the left handgrip 10 and the right handgrip 20 comprises an arc-surface handgrip part a and a planar bearing part b that is formed at the front end of the arc-surface handgrip part a; a limit plate part c that is connected with the arc-surface handgrip part a into a whole body is formed in front-back directions on one side, far away the bearing balance seat 30, of the planar bearing part b; and an L-shaped placement platform part d is formed on the upper surface of the planar bearing part b by utilizing surrounding of the limit plate part c and the arc-surface handgrip part a to the planar bearing part b. Therefore, the L-shaped placement platform parts d can be used for providing placement spaces for the left end and the right end of the electronic device so as to enable the electronic device to be stably clamped between the two handgrips; furthermore, the arc-surface handgrip parts a can utilize the arc-surface structure form of the traditional gamepad, so that the user feels excellently comfortable when gripping the arc-surface handgrip parts a.

In order to facilitate connection of the electronic device with other devices, for example, in a game control process, charge the electronic device to enable the electronic device to be connected with another matched device (such as a loudspeaker box, an on-screen display and the like) through a connecting line, a hollow stripped hole e is opened in each limit plate part c, and the hollow stripped holes e provide hole spaces for wire arrangement of external ports (such as a charging port, an audio interface and the like) of the electronic device.

In order to further optimize the structure of the whole handle and enrich its practicability, an arc-surface chute f inclined towards the corresponding L-shaped placement platform part d is opened on the upper surface of the front end of the corresponding arc-surface handgrip part a, and meanwhile, an antiskid pad g is arranged on the upper surface of the corresponding L-shaped placement platform part d. In use, the user can detach the electronic device arranged on the handle by utilizing the arc-surface chutes f; and due to the arrangement of the antiskid pads g, not only the arrangement stability of the electronic device can be ensured, but also hard scrapping between the electronic device and the outer surface of the handle can be prevented.

In order to ensure that the left handgrip and the right handgrip have excellent sliding performance and structure accommodation performance corresponding to the bearing balance seat 30, in the embodiment, the bearing balance seat 30 comprises a base 31 and an upper housing 32 that are spliced into a whole body; a back right bushing post 33 for fixing the right end of the back tension spring 50 is arranged on the lower surface of the upper housing 32 and is located on the right-end side of the back tension spring 50, and a front left bushing post 34 for fixing the left end of the front tension spring 40 is arranged on the lower surface of the upper housing 32 and is located on the left-end side of the front tension spring 40; and a front right bushing post 16 for fixing the right end of the front tension spring 40 is arranged on the right side wall of the front limit slot 15, and a back left bushing post 26 for fixing the left end of back tension spring 50 is arranged on the left side wall of the back limit slot 25. Therefore, by utilizing all the bushing posts, the corresponding tension springs can be stably and firmly mounted in the corresponding limit slots, thereby improving the structure compactness of the whole handle.

In order to further enhance the arrangement stability of the electronic device, a plurality of racks h distributed mutually left and right in parallel are arranged on the bottom surface of the left guide plate 12 and the bottom surface of the right guide plate 22, and a lock plate buckle k that is propped against the corresponding racks h is arranged in each of regions covered by the left guide plate 12 and the right guide plate 22. Therefore, when the electronic device is clamped by utilizing the left handgrip and the right handgrip, the distance between the left handgrip and the right handgrip can be locked by utilizing such prop-against relation between the lock plate buckles k and the racks h, thereby helping the electronic device to be changed, mounted and detached.

Certainly, as a preferred scheme, an antiskid pad g can be also arranged on the upper surface the upper housing 32.

The foregoing descriptions are merely preferred embodiments of the present application, and the protection scope of the present application is not limited thereto. All equivalent structural or process changes made according to the content of this specification and accompanying drawings in the present application or by directly or indirectly applying the present application in other relevant technical fields shall fall within the protection scope of the present application.

The invention claimed is:

1. A clamping type game operating handle, comprising: a left handgrip and a right handgrip that are distributed mutually in mirror image, and a bearing balance seat arranged between the left handgrip and the right handgrip; wherein,
  a left main sliding plate and a left guide plate are distributed mutually forth and back in parallel and are formed on the right side wall of the left handgrip, the right end of the left main sliding plate and the right end of the left guide plate are placed in the bearing balance seat, a left locating plate is formed on the right side wall of the left main sliding plate, a back guide sliding slot is formed between the left main sliding plate and the left guide plate, a front limit slot that is distributed in left-right directions and extends to the left locating plate is opened in the left main sliding plate, a front tension spring that is distributed in the left-right directions is mounted in the front limit slot, the left end of the front tension spring is fixed on the inner wall of the left side of the bearing balance seat, and the right end of the front tension spring is fixed on the right side wall of the front limit slot;
  a right guide plate and a right main sliding plate are distributed mutually forth and back in parallel and are formed on the left side wall of the right handgrip, the left end of the right guide plate and the left end of the right main sliding plate are placed in the bearing balance seat, a right locating plate is formed on the left side wall of the right main sliding plate, a front guide sliding slot is formed between the right main sliding plate and the right guide plate, a back limit slot that is distributed in left-right directions and extends to the right locating plate is opened in the right main sliding plate, a back tension spring that is distributed in the left-right directions is mounted in the back limit slot, the left end of the back tension spring is fixed on the left side wall of the back limit slot, and the right end of the back tension spring is fixed on the inner wall of the right side of the bearing balance seat; and
  the left locating plate is embedded in the front guide sliding slot, the right locating plate is embedded in the back guide sliding slot, the left handgrip utilizing the front tension spring and the right handgrip utilizing the back tension spring perform telescopic movement in the left-right direction corresponding to the bearing balance seat.

2. The clamping type game operating handle according to claim 1, wherein each of the left handgrip and the right handgrip comprises an arc-surface handgrip part and a planar bearing part that is formed at the front end of the arc-surface handgrip part, a limit plate part that is connected with the arc-surface handgrip part into a whole body is formed in front-back directions on one side, far away the bearing balance seat, of the planar bearing part, and the limit plate part and the arc-surface handgrip part surround the upper surface of the planar bearing part to form an L-shaped placement platform part.

3. The clamping type game operating handle according to claim 2, wherein a hollow stripped hole is opened in each limit plate part.

4. The clamping type game operating handle according to claim 2, wherein an arc-surface chute inclined towards the corresponding L-shaped placement platform part is opened on the upper surface of the front end of the corresponding arc-surface handgrip part, and an antiskid pad is arranged on the upper surface of the corresponding L-shaped placement platform part.

5. The clamping type game operating handle according to claim 1, wherein the bearing balance seat comprises a base and an upper housing that are spliced into a whole body; on the lower surface of the upper housing, a back right bushing post for fixing the right end of the back tension spring is arranged and is located on the right-end side of the back tension spring, and a front left bushing post for fixing the left end of the front tension spring is arranged and is located on the left-end side of the front tension spring; and a front right bushing post for fixing the right end of the front tension spring is arranged on the right side wall of the front limit slot, and a back left bushing post for fixing the left end of back tension spring is arranged on the left side wall of the back limit slot.

6. The clamping type game operating handle according to claim 5, wherein a plurality of racks distributed mutually left and right in parallel are arranged on the bottom surface of the left guide plate and the bottom surface of the right guide plate, and a lock plate buckle that is propped against the corresponding racks is arranged in each of regions covered by the left guide plate and the right guide plate.

7. The clamping type game operating handle according to claim 5, wherein an antiskid pad is arranged on the upper surface the upper housing.

* * * * *